US006993852B2

(12) United States Patent
Russell et al.

(10) Patent No.: US 6,993,852 B2
(45) Date of Patent: Feb. 7, 2006

(54) GAUGE AND PROCESS FOR ADJUSTING BEARINGS

(75) Inventors: Daniel T. Russell, East Sparta, OH (US); Mark R. Ries, Canal Fulton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/467,372

(22) PCT Filed: Feb. 6, 2002

(86) PCT No.: PCT/US02/03979

§ 371 (c)(1),
(2), (4) Date: Aug. 6, 2003

(87) PCT Pub. No.: WO02/077475

PCT Pub. Date: Oct. 3, 2002

(65) Prior Publication Data

US 2004/0060185 A1    Apr. 1, 2004

Related U.S. Application Data

(60) Provisional application No. 60/266,790, filed on Feb. 6, 2001.

(51) Int. Cl.
*G01B 1/00*    (2006.01)
(52) U.S. Cl. .......................................... 33/517; 33/645
(58) Field of Classification Search ................. 33/613, 33/517, 832, 833, 555.1, 555.2, DIG. 2, DIG. 13, 33/DIG. 17, 542, 543, 548, 645, 555.4
See application file for complete search history.

(56) References Cited

U.S. PATENT DOCUMENTS 2,551,471 A * 5/1951 Snow .......................... 33/532

(Continued)

OTHER PUBLICATIONS

The Timken Company, Service Engineering Dept., "Gauging Concepts For Setting Tapered Roller Bearings", (1984).

*Primary Examiner*—Christopher W. Fulton
*Assistant Examiner*—Amy R. Cohen
(74) *Attorney, Agent, or Firm*—Polster, Lieder, Woodruff & Lucchesi, L.C.

(57) ABSTRACT

A setting gauge (G) determines the thickness of a spacer (22) which gives the correct setting for a pair of tapered roller bearings (B1, B2) that are mounted in opposition to accommodate relative rotation between machine components (S, H). The gauge has a base (50) which at one end fits against a surface (12) to which the spacer is to be applied, and at its other end holds one of the races (32) of the bearing (B2) remote from the other race (30) which remains in its operating position. In addition, the gauge has a pair of gauge elements (52, 54), one of which fits against a conical envelope along the remote race and the other of which fits against an identical conical envelope on the race which remains in its operating position, in effect, projecting the conical envelope defined by the in-place race out of the bearing to a remote location so that measurements may be taken from the bearing. The race which is remote during the measurements has a cylindrical surface (48) which is configured to fit another cylindrical surface (10) on one of the machine components (H) with an interference fit, and the gauge also measures the diameters of the two cylindrical surfaces so that the magnitude of the interference fit may be ascertained and its effect on the bearing compensated.

15 Claims, 2 Drawing Sheets

U.S. PATENT DOCUMENTS

| | | | |
|---|---|---|---|
| 2,916,830 A * | 12/1959 | Esken | 33/517 |
| 3,220,244 A * | 11/1965 | Donnelly | 73/37.6 |
| 3,308,546 A * | 3/1967 | Storch | 33/517 |
| 4,054,999 A * | 10/1977 | Harbottle | 29/898.07 |
| 4,150,468 A * | 4/1979 | Harbottle | 29/898.09 |
| 4,217,698 A * | 8/1980 | Van Sickle | 33/517 |
| 4,532,716 A * | 8/1985 | Steiner | 33/201 |
| 5,070,621 A * | 12/1991 | Butler et al. | 33/517 |
| 5,115,558 A | 5/1992 | Bernhardt et al. | |
| 5,325,599 A * | 7/1994 | Russell | 33/517 |
| 6,058,767 A * | 5/2000 | Calvin | 73/118.1 |
| 6,061,917 A * | 5/2000 | Graf | 33/201 |
| 6,257,078 B1 * | 7/2001 | Vencill | 73/865.9 |
| 6,502,307 B2 * | 1/2003 | Komaba et al. | 29/894.361 |
| 6,588,119 B1 * | 7/2003 | Russell et al. | 33/517 |
| 6,662,449 B2 * | 12/2003 | Rode | 29/898.09 |
| 6,796,031 B1 * | 9/2004 | Russell | 29/898.09 |

\* cited by examiner

GAUGE AND PROCESS FOR ADJUSTING BEARINGS

CROSS-REFERENCE TO RELATED APPLICATIONS

This application derives and claims priority from U.S. provisional application 60/266,790, filed Feb. 6, 2001, and from International application PCT/US02/03979, filed Feb. 6, 2002.

TECHNICAL FIELD

This invention relates in general to antifriction bearings and, more particularly, to a gauge and a process for adjusting such bearings.

BACKGROUND ART

Wherever shafts rotate in housings one finds bearings of one type or another to support such shafts. Single row tapered roller bearings organized in pairs and mounted in opposition perhaps function best in an installation of this type. These bearings carry heavy radial loads and thrust or axial loads as well. Being mounted in opposition, they can be adjusted against each other to varying conditions of end play or preload. Too much end play concentrates loads in limited regions of the bearings and furthermore creates radial and axial clearances which detract from the stability of the shaft. Preload insures that the shaft will rotate about a fixed axis and thus provides stability, but too much preload increases friction within the bearings and may lead to early bearing failure. Thus, the adjustment of oppositely mounted bearings against each other to achieve the proper setting represents an important step in the assembly of a shaft in a housing.

The typical tapered roller bearing has an inner race or cone, an outer race or cup and a single row of tapered rollers located between raceways on the cone and cup. When two such bearings are mounted in opposition, either the small ends of the rollers in the two rows are presented toward each other (indirect mounting) or the large ends are presented toward each other (direct mounting). Irrespective of the arrangement, the bearings are adjusted by controlling the spacing between the cups of the two bearings or the spacing between the cones. Installing shims or spacers behind a cup or a cone in a bearing arrangement represents one of the more common practices for controlling the spacing that determines the setting for the bearings.

Perhaps trial and error is the least complex procedure for determining the size of a shim or spacer, but this procedure lacks precision and is more time consuming. More sophisticated procedures rely on measurements. Indeed, one procedure, in effect, projects surfaces out of a bearing where the distance between the surfaces is easily measured. From these measurements one can select a shim that will provide a setting that closely proximates the desired setting.

But in the typical bearing arrangement having two single row tapered roller bearings factors other than the measurements taken from the projected surfaces affect the setting. For example, an interference fit between the cylindrical exterior surface of a cup and the cylindrical housing bore into which the cup fits will shrink the diameter of the cup raceway and thus change the width of the bearing. That in turn will alter the setting of the oppositely mounted bearings. The typical procedure for projecting surfaces takes the interference fit into account only from the standpoint of the nominal dimensions for the interfering cylindrical surfaces that produce the interference fit. But tolerances in the outer diameter of a cup and in the bore into which it fits can vary the magnitude of the interference fit, and this in turn will produce a variance from the desired setting for the bearings. To be sure, the cylindrical surfaces may be measured separately, but the components that make up the setting must be serialized and united at assembly.

SUMMARY OF THE INVENTION

The present invention resides in a setting gauge which in effect projects a conical envelope out of one of two tapered roller bearings that are mounted in opposition, so that axial measurements may be made between the projected conical envelope and another and identical conical envelope that assumes its normal operating position, all for calculating adjustments necessary to give the bearings the proper setting. The gauge also measures the diameter of a cylindrical surface on a race that carries the projected envelope and also the diameter of another cylindrical surface along which the race is to be installed with an interference fit. It determines the change in bearing width caused by the interference fit. The invention also resides in the gauge together with inner and outer machine components on which it is installed to make the measurements. In addition, the invention resides in the process utilized by the gauge.

BEST MODE FOR CARRYING OUT THE INVENTION

Figure 1:
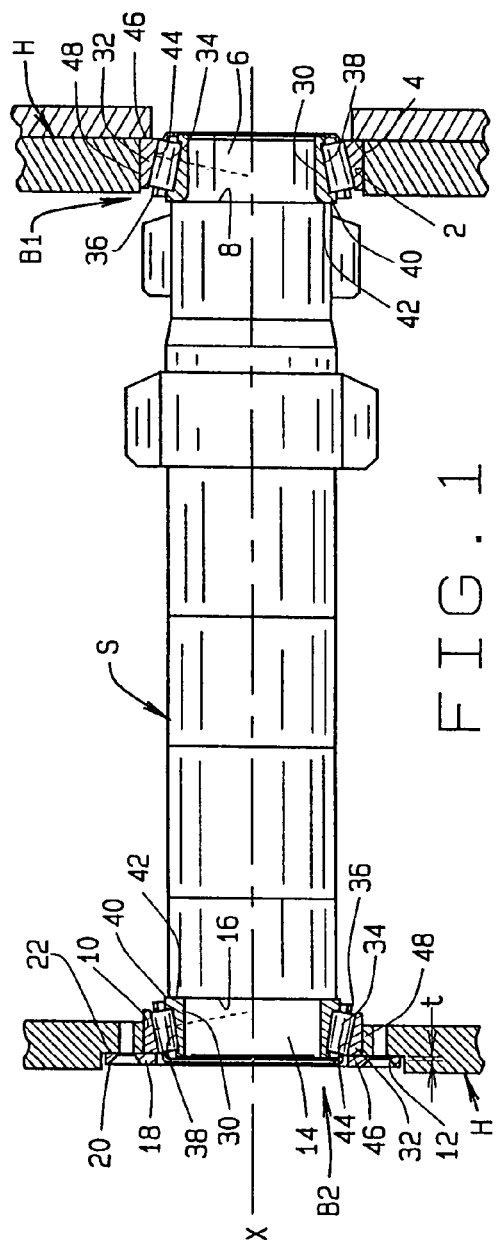
FIG. 1 is a longitudinal sectional view of a shaft supported on bearings adjusted with a gauge constructed in accordance with and embodying the present invention.

Referring now to the drawings (FIG. 1), a shaft S rotates in a housing H on two tapered roller bearings B1 and B2 which establish the axis of rotation X for the shaft S. The bearings B1 and B2 transfer radial loads between the shaft S and housing H as well as thrust loads, the bearing B1 taking thrust loads in one axial direction and the bearing B2 in the other. The shaft S constitutes an inner machine component, whereas the housing H constitutes an outer machine component.

At its one end the housing H contains (FIG. 1) a bore 2 which leads up to a shoulder 4. At the same end the shaft S has a bearing seat 6 which leads up to a shoulder 8 that is presented toward the shoulder 4 in the housing H. The bearing B1 fits into the bore 2 and around the seat 6. At its opposite end the housing H contains a cylindrical through bore 10 that opens out of a reference surface 12 which is recessed and perpendicular to the axis X. The shaft S at this end has a bearing seat 14 which leads up to a shoulder 16 that is presented in the same direction as the reference surface 12. The bearing B2 fits into the bore 10 and around the seat 14. Whereas the shoulder 4 prevents the bearing B1 from moving out of its bore 2, the bearing B2 is confined to its bore 10 by an annular retainer 18 that is secured to the housing H at the reference surface 12 with machine screws 20. Between the reference surface 12 and the retainer 18 lies a spacer, such as a shim 22, having a thickness $t$.

Each bearing B1 and B2 includes (FIG. 1) an inner race in the form of a cone 30, an outer race in the form of a cup 32 that surrounds the cone 30, and rolling elements in the form of tapered rollers 34 organized in a single row between the cone 30 and the cup 32. Each also has a cage 36 which maintains the proper spacing between adjacent rollers 34. The cone 30 has a tapered raceway 38 that is presented outwardly away from the axis X and a thrust rib 40 at the large end of the raceway 38. The thrust rib 40 leads out to a back face 42 that is squared off with respect to the axis X. The cup 32 has a tapered raceway 44 that is presented inwardly toward the raceway 38 of the cone 30. The raceway 44 tapers downwardly to a back face 46 that is likewise squared off with respect to the axis X. While the raceway 44 is presented inwardly, the cup 32 has a cylindrical exterior surface 48 that is presented outwardly away from the axis X. The tapered rollers 34 have tapered side faces along which they contact the raceways 38 and 44, there being generally line contact between the side faces and raceways 38 and 44. The rollers 34 also have large end faces along which they contact the thrust rib 40. Indeed, the thrust rib 40 prevents the rollers 34 from moving up the raceways 38 and 44 and vacating the annular space between the raceways 38 and 44. The rollers 34 are on apex, meaning that the conical envelopes in which the side faces of the rollers 34 lie have their apices at a common point along the axis X as do the conical envelopes for the raceways 38 and 44.

The cone 30 of the bearing B1 fits over the bearing seat 6 with an interference fit and with its back face 42 against the shoulder 8 on the shaft S. The cup 32 of the bearing B1 fits into the bore 2 of the housing H with an interference fit and with its back face 46 against the shoulder 4 at the end of the bore 2. The bearing B1 transfers radial loads between the shaft S and the housing H, and by reason of its tapered geometry, prevents the shaft S from moving farther toward the shoulder 4 in the housing H and away from the bearing B2.

The cone 30 of the bearing B2 fits over the other bearing seat 14 with an interference fit and with its back face 42 against the shoulder 16. The cup 32 of the bearing B2 fits into the through bore 10 with an interference fit. Its back face 46 bears against the retainer 18, so the retainer 18 prevents the cup 32 of the bearing B2 from migrating out of the bore 10. The bearing B2 likewise transfers radial loads between the shaft S and housing H and by reason of its tapered geometry prevents the shaft S from moving in the opposite direction through the bore 10, that is to say, farther toward the retainer 18 and away from the bearing B1. Thus, the two bearings B1 and B2 confine the shaft S in the housing, both radially and axially, yet enable the shaft S to rotate about the axis X with minimal friction. The thickness t of the shim 22 determines the axial position of the cup 32 for the bearing B2 in the through bore 10, and that in turn determines the setting for the two bearings B1 and B2.

Figure 2:
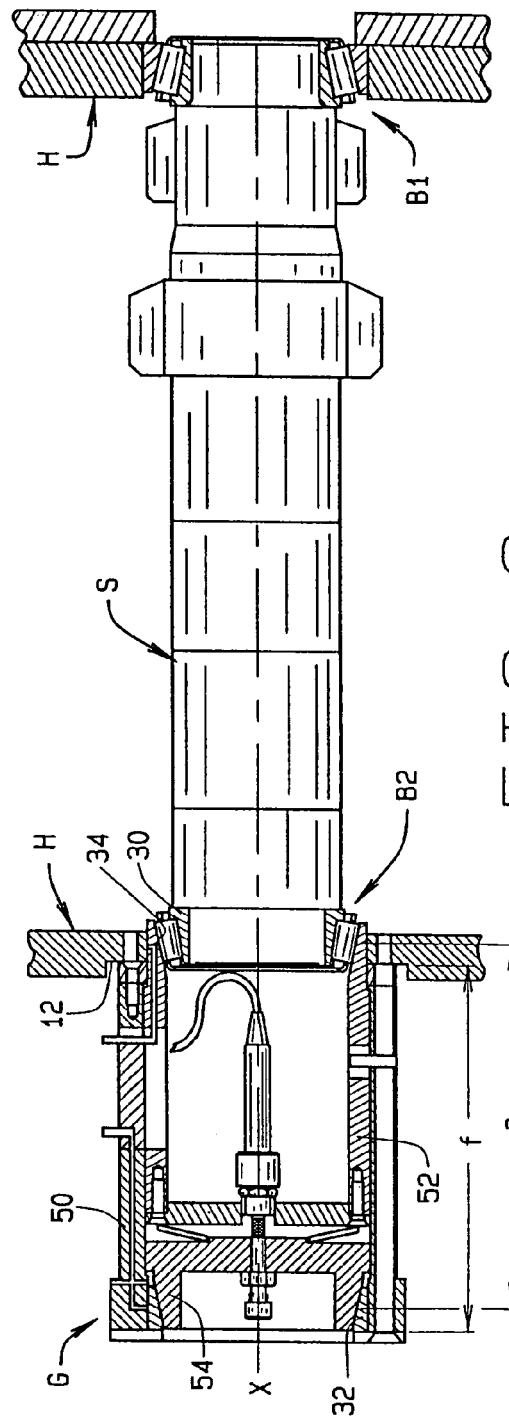
FIG. 2 is a sectional view of the housing and shaft with the gauge fitted to one of the bearings.
Figure 3:
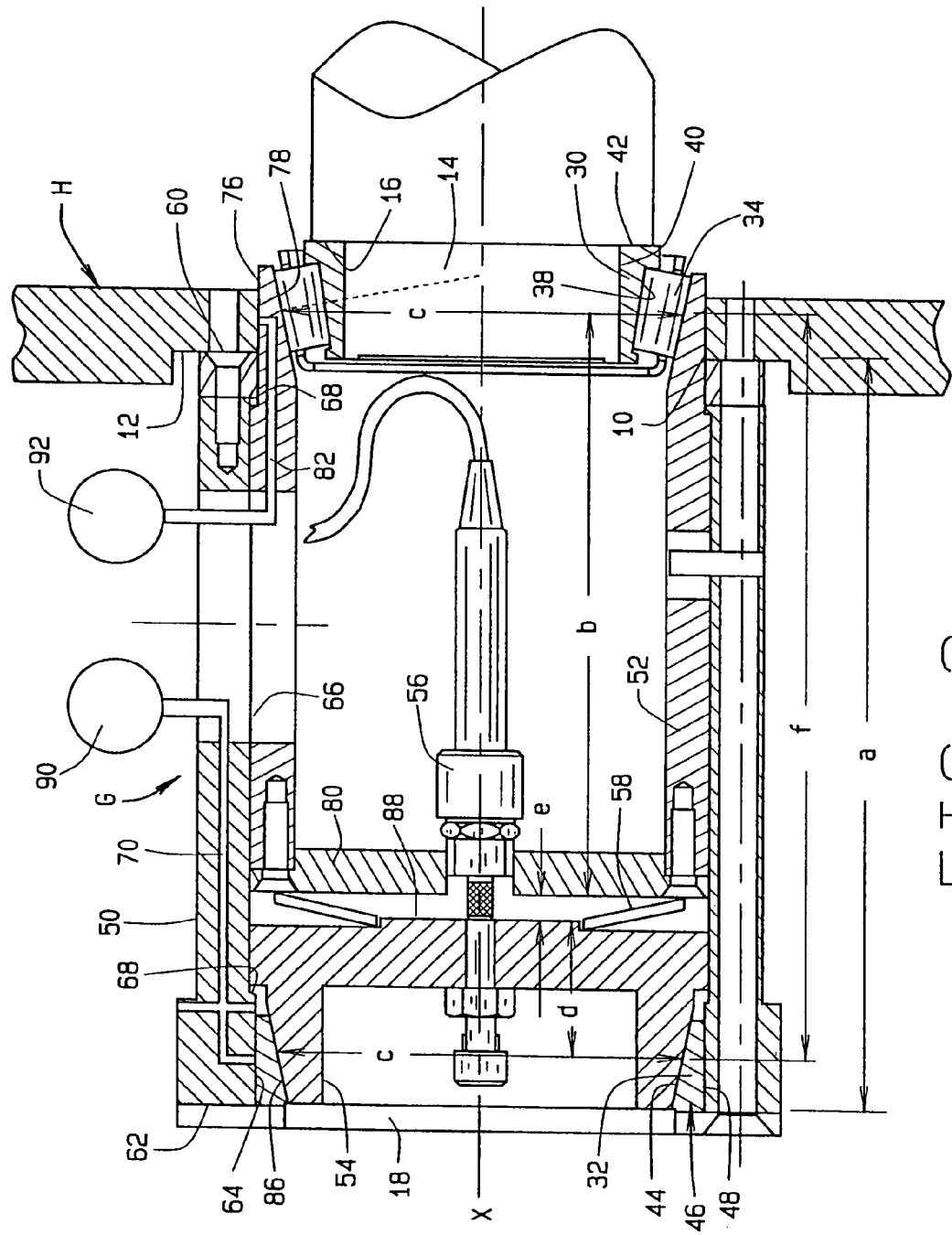
FIG. 3 is an enlarged sectional view of the gauge.

After selecting the setting desired for the bearings B1 and B2, whether it be end play or more likely preload, one determines the thickness $t$ of the shim 22 from measurements derived from a setting gauge G (FIGS. 2 and 3) that, in effect, projects the cup raceway 44 and back face 46 axially beyond the cone 30 of the bearing B2. Actually, the gauge G separates two conical envelopes that coincide when the bearing B2 is in its operating condition, the one envelope being the tapered raceway 44 of the cup 32 and the other being formed by the outwardly presented surfaces on the tapered rollers 34. One end of the gauge G fits into the through bore 10 of the housing H and around the rollers 34 of the bearing B2. At that end it also bears against the reference surface 12. At its other end the gauge G receives the cup 32 of the bearing B2 and has the retainer 18 or a like retaining plate secured to it, although temporarily. The gauge G includes an outer member or base 50 and two inner members, namely a female element 52 and a male element 54, each of which has the capacity to slide independently of each other within the base 50. In addition, the gauge G has a measuring device 56, such as a linear variable differential transformer (LVDT), which is mounted on the female element 52 where it measures the distance between the two inner elements 52 and 54. Finally, the gauge G has a spring 58 which urges the two inner elements 52 and 54 apart with a light force.

The base 50, which resembles a sleeve, at one end is small enough to fit against the recessed reference surface 12 at the end of the through bore 10 in the housing H. Here the base 50 is provided with an end face 60 that is squared off with respect to the axis X. At its opposite end the base 50 has another end face 62 which is likewise squared off with respect to the axis X. The two end faces 60 and 62 lie a known distance $a$ apart. Internally, the base 50 has a cylindrical end bore 64 which opens out of the end face 62, it having a diameter that is slightly greater than the diameter of the outer surface for the cup 32 of the bearing B2. Thus, the cup 32 of the bearing B2 will fit loosely into the bore 64. Moreover, the length of the end bore 64 exceeds the length of the cup 32, so that the bore 64 will receive the cup 32 in its entirety. The base 50 also contains a larger extended bore 66—actually a counterbore—which receives the two inner elements 52 and 54, with the female element 52 extending out to and beyond the end face 60 and the male element 54 extending into the end bore 64. At the ends of the extended bore 66, the base 50 has stops 68 which confine the inner elements 52 and 54 to the base 50. Finally, the base 50 has an air channel 70 that leads to and opens into the end bore 64.

The female element 52 fits within the extended bore 66 such that it can slide to and fro in the bore 66, but with relatively little radial clearance. At one end, the female element 52 projects beyond the end face 60 of the base 50, and here it possesses a cylindrical external surface 76 that is slightly smaller in diameter than the through bore 10 of the housing H. At this end, the female element 52 also has an internal conical gauging surface 78 that opens out of the end where it is presented inwardly toward the axis X, its taper corresponding to the taper of the conical envelope formed by the outer surfaces of the rollers 34, which is the same as the taper of the raceway 44 for the cup 32 of the bearing B2. In other words, the included angle between the conical surface 78 and the axis X corresponds to the included angle between the tapered raceway 44 and the axis X. At its other end, which is within the bore 66 of the base 50, the female element 52 has an end plate 80. A fixed distance $b$ exists between an arbitrary diameter $c$ along the conical surface 78 and the end plate 80. The female element 52 contains an air channel 82 which leads to and opens out of the cylindrical exterior surface 76.

The male element 54 likewise fits within the bore 66 of the base such that it can slide to and fro in the bore 66. It has an external conical gauging surface 86 which leads out to its end and is presented outwardly away from the axis X, with the inclination of that surface 86 relative to the axis X corresponding to the inclination of the tapered raceway 44 on the cup 32 of the bearing B2. Moreover, the conical surface 86 is small enough to fit into and contact the tapered raceway 44 for the cup 32 of the bearing B2. At one point along it, the conical surface 86 has a diameter $c$ which equals the diameter $c$ along the conical interior surface 78 on the female element 52. The male element 54 also has an end face 88 that is perpendicular to the axis X, and that end face 88 lies at a distance $d$ from the diameter $c$ of the conical exterior surface 86.

The two air channels 70 and 82 are connected to air gauges 90 and 92, respectively, which discharge air through the channels 70 and 82 to measure the gaps between the ends of the channels 70 and 82 and surfaces beyond those ends. The channels 70 and 82 and their respective gauges 90 and 92 constitute additional measuring devices.

The measuring device 56 is mounted on the end plate 80 of the female element 52, and it measures the distance $e$ between the end plate 80 and the end face 88 on the other male element 54. Thus, the distance $f$ between the corresponding diameters $c$ along the conical interior surface 78 on the element 52 and along the conical exterior surface 78 in the element 54 equals the sum of the distances $b$, $d$, and $e$, that is to say:

$$f = b + d + e$$

In order to install the shaft S in the housing H with the proper setting in the bearings B1 and B2, the cones 30 for the two bearings B1 and B2, each with its complement of rollers 34 around it, are pressed onto their respective bearing seats 6 and 14 on the shaft S with their back faces 42 against the shoulders 8 and 16. Likewise, the cup 32 for the bearing B1 is pressed into its bore 2 in the housing H with its back face 46 against the shoulder 4. Then the shaft S is installed in the housing H such that the cone 30 and rollers 34 for the bearing B1 fit into the cup 32 for the bearing B1. This supports one end of the shaft S on the bearing B1. The cone 30 and rollers 34 for the bearing B2 lie within the through bore 10 at the other end of the housing H. The gauge G is fitted into the through bore 10 and around the cone 30 and rollers 34 for the bearing B2 to temporarily support the other end of the shaft G. The cup 32 for the bearing B2 is fitted to the gauge G where it lies remote from the cone 30 and rollers 34 for the bearing B2.

More specifically, the cup 32 for the bearing B2 is fitted over the conical gauging surface 86 on the male element 54 of the gauge G and into the end bore 64 of the base 50. Then the retainer 18 is attached to the end of the base 50 to provide a backing for the cup 32 and prevent it from escaping. The spring 58 urges the male element 54 into the cup 32, causing the external conical surface 86 on the male element 54 to seat snugly against the tapered raceway 44 of the cup 32 and driving the back face 46 of the cup 32 snugly against the retainer 18. This, positions the back face 46 of the cup 32 in the same plane as the end face 62 on the base 50 of the gauge G. The cylindrical exterior surface 48 on the cup 32 rests against the surface of the bore 64 diametrically opposite the end of the air channel 70, leaving enough clearance between exterior cylindrical surface 48 of the cup 32 and the surface of the end bore 64 at the end of the air channel 70 to enable air to escape from the end of the air channel 70. That clearance should range between about 0.18 and 0.25 mm (0.007 to 0.010 in.)

Once the cup 32 for the bearing B2 is installed in the gauge G, the gauge G is aligned with the shaft S and advanced over the cone 30 and rollers 34 of the bearing B2 until the end face 60 on the base 50 is against the reference surface 12 on the housing H. When the base 50 is so disposed, the cylindrical exterior surface 76 of the female element 52 lies within the through bore 10 of the housing H and the conical internal surface 78 fits around the rollers 34 of the bearing B2. Indeed, the spring 58 urges the conical gauging surface 78 snugly against the side faces of the set of rollers 34, placing it within the conical envelope formed by the rollers 34. The cylindrical exterior surface 76 on the inner member 52 rests on the surface of the through bore 10 diametrically opposite the end of the air channel 82, leaving enough clearance between the cylindrical surface 76 of the inner member 52 at the end of the air channel 82 and the surrounding surface of the bore 10 to enable air to escape from the end of the air channel 82. That clearance should also range between about 0.18 and 0.25 mm.

Once the gauge G is installed against the housing H and around the rollers 34 of the bearing B2, the shaft S is rotated slowly to seat the rollers 34 of the bearings B1 against its raceways 38 and 44 and the rollers 34 of the bearing B2 against its cone raceway 38 and the conical gauging surface 78.

The distance $b$ between the diameter $c$ on the conical gauging surface 78 and the end plate 80, both on the female element 52, is known, as is the distance $d$ between the corresponding diameter $c$ on conical gauging surface 86 and the end face 88 of the other inner member 54. The measuring device 56 measures the distance $e$ between the end plate 80 of the inner member 52 and the end face 88 of the other inner member 54. The sum of the three distances $b$, $d$ and $e$ equals the distance $f$ between the corresponding diameters $c$ on the conical gauging surface 78 and the conical gauging surface 86, or, in other words, equals the distance of $f$ between corresponding diameters $c$ on the envelope formed by the outer surfaces of the rollers 34 and the envelope formed by the cup raceway 44. That distance $f$ less the distance $a$ between the end faces 60 and 62 of the base 50 gives the distance that the back face 46 of the cup 32 for the bearing B2 will locate beyond the reference surface 12 if the cup 32 were installed in the through bore 10 without an interference fit and with the bearings B1 and B2, in a condition of zero end play (no end play, no preload). The difference between the distances $f$ and $a$ is best perceived by visualizing the diameter $c$ along the gauging surface 78 moved to a plane defined by the reference surface 12 of the housing H. This moves the diameter $c$ along the other gauging surfaces 86—and along the cup raceway 44—to a position where that much of the cup 32 which projects beyond it is the amount of bearing lateral for which the shim must compensate were there is no interference fit between the through bore 10 and the cup 32.

However, the interference fit between the through bore 10 and the cup 32 of the bearing B2 will cause the raceway 44 of the cup 32 for the bearing B2 to shrink, and that will increase the bearing lateral by displacing the back face 46 of the cup 32 an additional distance $g$ beyond the reference surface 12 on the housing H. The air gauges 90 and 92 provide measurements for calculating the further displacement $g$ caused by the interference fit. In this regard, the air gauge 90 discharges air through the air channel 70 in the base 50 and against the cylindrical exterior surface 48 of the cup 32 for the bearing B2, and in effect, measures the diameter of the exterior surface 48 with considerable precision. The air gauge 92 discharges air through the air channel 82 in the female element 52, and in effect, measures the diameter of the through bore 10 also with considerable precision. From the measurements of the two diameters, one can calculate the interference fit. Well-known formulas exist for translating the interference fit and the shrinkage of the cup raceway 44 that it causes into the displacement $g$ of the cup back face 46.

Thus, the thickness $t$ of the shim 22 which will provide the bearings B1 and B2 with the proper setting in terms of a lineal dimension $j$ reduces to $$t = (f-a) + g \pm j$$

The dimension j is positive when the setting is end play and negative when it is preload.

Variations are possible. For example, the raceways 38 and 44 for the bearing B1 may be directly on the shaft S and housing H and likewise the raceway for the bearing B2 may be on the shaft S, thus, eliminating any one or both cones 30 and perhaps the cup 32 of the bearing B1 as well. The measuring devices for the cylindrical surface of the bore 10 and the cylindrical surface 48 of the cup 32 for the bearing B2 may take forms other than the air gauges 90 and 92, for example, LVDTs. In lieu of installing the spacer behind the cup back face 46 for the bearing B2, it may be installed between the cone back face 42 for the bearing B2 and the shaft shoulder 16. Indeed, the gauge G may be configured to select a spacer for directly mounted bearings B as well. Also, the shaft S may be fixed, and the housing H may rotate about it.

What is claimed is:

1. A gauge for setting a pair of tapered roller bearings mounted in opposition along a common axis and between inner and outer machine components, one of which has a cylindrical surface to which a race of one of the bearings is to be fitted with an interference fit and also has a reference surface located at an angle with respect to the axis, said gauge comprising:
    a base having an end face configured to fit against the reference surface and at its other end configured to hold the race that is to be fitted to the cylindrical surface, so that the race is detached from said one machine component;
    a first gauge element mounted on and shiftable axially relative to the base and having a gauging surface for contacting a conical envelope on the detached race that is carried by the base;
    a second gauge element also mounted on and shiftable relative to the base and having a gauging surface for contacting an identical conical envelope on the bearing of which the detached race is also a part;
    a first measuring device for determining the axial positions of the first and second gauge elements to ascertain the distance between gauging surfaces on them;
    a second measuring device for determining the diameter of the race that is carried by the first gauge element; and
    a third measuring device for determining the diameter of the cylindrical surface of the one machine component, so that the magnitude of the interference fit may be ascertained.

2. A gauge according to claim 1 wherein the gauging surfaces on the first and second gauge elements are tapered.

3. A gauge according to claim 2 wherein the second measuring device is on the base and the third measuring device is on the second gauge element.

4. A gauge according to claim 3 wherein the second measuring device includes an air channel which opens out of the base and the third measuring device includes an air channel which opens out of the second gauge element.

5. A gauge according to claim 2 and further comprising a spring which urges the first and second gauge elements apart.

6. A gauge according to claim 1 wherein the first and second gauge elements are located within the base.

7. A gauge according to claim 6 wherein the gauging surface on the first gauge element is presented outwardly away from the axis and the gauging surface on the second gauge element is presented inwardly toward the axis.

8. In combination with the gauge of claim 1, inner and outer machine components and first and second bearings for accommodating relative rotation between the machine components about an axis, one of the machine components having a cylindrical surface located around the axis and a reference surface located at an angle with respect to the axis, the first bearing including inner and outer tapered raceways carried by the inner and outer machine components, respectively, and tapered rollers organized in a row between the raceways, the second bearing including inner and outer tapered raceways and tapered rollers located along the inner raceway, the outer raceway and the tapered rollers defining identical conical envelopes having their axes coinciding with axis of rotation, one of the raceways of the second bearing being on a race having a cylindrical surface that is sized to fit along the cylindrical surface of said one machine component with an interference fit and also having an end face oriented at an angle with respect to the axis, the other raceway of the second bearing being carried by the other machine component, the tapered rollers of the first and second bearings being oriented in opposite directions, and
    wherein the base of the gauge bears against the reference surface on said one machine component and temporarily carries the race of the second bearing at a location axially offset from the cylindrical surface of the one machine component so that the two conical envelopes are spaced apart axially;
    wherein the gauging surface of the first gauge element bears against the conical envelope on the axially separated race;
    wherein the gauging surface of the second gauge element bears against the conical envelope that is on said other machine component;
    wherein the first measuring device determines the spacing between equivalent diameters on the two conical envelopes;
    wherein the second measuring device determines the diameter of the cylindrical surface on the race carried by the base; and
    wherein the third measuring device determines the diameter of the cylindrical surface on said one machine component;
    whereby the magnitude of the interference fit between the race of the second bearing and cylindrical surface on said one machine component may be ascertained.

9. The combination according to claim 8 wherein the gauging surfaces on the first and second gauge elements are tapered and inclined at equal angles with respect to the axis, which angle corresponds to the angles of the conical envelopes.

10. The combination according to claim 9 wherein the second measuring device is along the base and the third measuring device is along the second gauge element.

11. The combination according to claim 10 wherein the cylindrical surface on said one machine component is the surface of a bore in the outer machine component.

12. The combination according to claim 11 wherein the tapered rollers for the second bearing are around the raceway on the inner machine component and the second gauge element projects into the bore of the outer machine component.

13. The combination according to claim 10 wherein the first and second gauge elements are located within the base.

14. The combination according to 10 wherein the first measuring device measures the distance between the first and second gauge elements.

15. A process for setting first and second bearings for accommodating relative rotation between inner and outer machine components about an axis, one of the machine components having a cylindrical surface located around the axis and a reference surface located at an angle with respect to the axis, the first bearing including inner and outer tapered raceways carried by the inner and outer machine components, respectively, and tapered rollers organized in a row between the raceways, the second bearing including inner and outer raceways and tapered rollers located along the inner raceway, the outer raceway and the tapered rollers defining identical conical envelopes having their axes coinciding with the axis of rotation, one of the raceways of the second bearing being on a race having a cylindrical surface that fits along the cylindrical surface of said one machine component with an interference fit and also having an end face oriented at an angle with respect to the axis and spaced axially from the reference surface, the other raceway of the second bearing being carried by the other machine component, the tapered rollers of the first and second bearings being oriented in opposite directions, said process comprising:

placing the inner machine component in the outer machine component;

eating the rollers of the first bearing along the tapered raceways for the first bearing;

locating one of the conical envelopes for the second bearing on said other machine component;

axially separating the other conical envelope and the race of the second bearing from said one conical envelope;

measuring the axial distance between equivalent diameters on the separated conical envelopes;

while the conical envelopes are separated axially, measuring the diameters of the cylindrical surfaces on the race and on said one machine component;

installing the race along the cylindrical surface of said one machine component;

from the measured axial distance between equivalent diameters on the separated conical envelopes and the measured diameters of the cylindrical surfaces, calculating the thickness of the spacer which, when fitted against the reference surface on said one machine component, will provide the first and second bearings with the desired setting.

* * * * *